United States Patent Office 3,434,988
Patented Mar. 25, 1969

3,434,988
PREPARATION OF POLYCARBOXYLIC ACID RESINS USING AN ORGANIC SULFONIC ACID CATALYST
Richard B. Graver, Savage, and Grant O. Sedgwick, Minneapolis, Minn., assignors, by mesne assignments, to Ashland Oil and Refining Company, a corporation of Kentucky
No Drawing. Filed Sept. 21, 1965, Ser. No. 489,034
Int. Cl. C08g 17/16, 17/10
U.S. Cl. 260—23.7                    4 Claims

ABSTRACT OF THE DISCLOSURE

Water-dilutable thermosetting resinous compositions particularly suited for use in electrocoating applications are obtained by heat-reacting a lower alkanol or diol with a preformed, lower alkyl sulfonic acid catalyzed adduction product of a drying oil and dicarboxylic acid or anhydride thereof.

---

This invention relates to a process for preparing polycarboxylic acid resins. In another aspect, it relates to a process for preparing water-dispersible, partially neutralized polycarboxylic acid resins which, when thinned with water, provide excellent primer coatings. In another aspect, it relates to the polycarboxylic acid resins, and their neutralized products, as new compositions which are particularly suitable in coating compositions. In a further aspect, the present invention relates to the use of such polycarboxylic acid resins in electrocoat painting of electrically conductive substrates such as articles with metallic surfaces, e.g., automobile bodies.

In recent years, there has been a great deal of research and commercial activity in the development of water-dispersible resins for coating applications. One very significant resin system which has been developed is that based on partially neutralized adducts for drying oils and alpha, beta-ethylenically unsaturated dicarboxylic acids and anhydrides, such as maleic anhydride (see U.S. Patent No. 3,098,834, issued to Robert D. Jerabek). Though such resins have proven satisfactory for many coating applications, such use has been limited in some applications, e.g., because of the relatively low viscosity of such systems. When lower viscosity resins are used in electrocoating metallic substrates, if high voltages, for example, 250 to 500 volts, are used, the resinous film often ruptures, sags or breaks down and develops holes when the film is baked, That is, these resin systems do not have high voltage capabilities.

The term "high voltage capability" is understood in the art and used herein to mean the ability of the resin system to deposit at high voltages a film which has integrity and a serviceable thickness; a resin system which does not have this high voltage capability manifests such inability by extreme gassing, film rupture, excessive film thickness and rapid rise in amperage during electrocoating.

Attempts to increase the viscosity of these resin systems to obtain higher voltage capability and/or to obtain films with good properties have proven unsatisfactory for one reason or another. As a result, in order to get films with satisfactory film integrity, the less efficient lower voltages must be resorted to when the lower viscosity resins are used.

Copending application No. 424,825 produces a resin which has properties quite similar to the resin produced by the instant procedure. However, while these desirable results can be obtained with the resin produced by the method disclosed in the copending application, a comparatively long reaction time is required. Further, it has been found that the film hardness of the resin can be improved.

Accordingly, an object of this invention is to provide a process for preparing improved polycarboxylic acid resins. Another object is to provide an improved process for preparing water-dispersible, partially neutralized polycarboxylic acid resins. Another object is to provide improved water-thinnable polycarboxylic acid resins with high viscosities which are stable and which can be used as vehicles or components in film-forming coating compositions, especially in primer compositions. Another object is to provide improved polycarboxylic acid resins which have low voltage capabilities when used in electrocoat painting. Another object is to provide an improved process for electrocoat painting of electrically conductive substrates, such as metallic articles and the like, using such polycarboxylic acid resins as vehicles. Further objects and advantages of this invention will become apparent to those skilled in the art from the following description and the claims which are appended.

Briefly, we have discovered that improved polycarboxylic acid resins can be prepared by heating (1) a drying oil or semidrying oil or a chemically modified drying or semidrying oil, (2) an alpha, beta-ethylenically unsaturated dicarboxylic acid, anhydride or half-ester thereof, and (3) a low molecular weight material soluble in the acid reaction mixture under the conditions of reaction in the presence of an organic sulfonic acid catalyst, said heating being continued until a polycarboxylic acid resin product with a desirably high viscosity is obtained. By use of the catalyst, the reaction rate of the reaction between component (1) and component (2) is increased, and further, the reaction between the resulting product and component (3) is aided by the use of the catalyst. Moreover, the films produced from the resins of this invention are harder than those obtained when no catalyst is used. The polycarboxylic acid resin product remains stable on standing, and such resin can be neutralized and used as a water-dispersible vehicle in coating compositions, especially in electrocoating.

There are two general procedures which can be used to prepare the polycarboxylic acid resins of this invention. According to one procedure (which will be referred to herein as the "two-step" resin-forming procedure), the alpha, beta-unsaturated reactant, e.g., maleic anhydride, is first heated and reacted with a chemically-modified drying oil, for example, a polymer of cyclopentadiene and linseed oil, in the presence of an organic sulfonic acid catalyst, e.g., methane sulfonic acid, to form a resinous polycarboxylic acid adduct. The adduct is then heated and reacted in a subsequent step with the low molecular weight material, e.g., an alkanol, until a polycarboxylic acid resin product with said high viscosity is obtained. According to the other procedure, which is referred to herein as the "one-step" resin-forming procedure, the alpha, beta-unsaturated material, the drying oil precursor, the sulfonic acid catalyst, and the lower molecular weight material are heated as a single charge until a resin product with said high viscosity is obtained.

The term "drying oil precursor," as used herein, includes those oils which are understood in the art to be drying oils and semidrying oils, for example, the iodine values of drying oils are usually in excess of 150 but the term "drying oil component" includes those semidrying oils having iodine values as low as 100.

The two-step procedure, wherein the resin-forming reactants are charged sequentially to a reaction vessel, is presently preferred. This two-step procedure is preferably carried out batch-wise in a sealed reactor by first heating the drying oil or semidrying oil and the organic sulfonic acid catalyst to an elevated temperature, usually 100° to 300° F., and then adding the alpha, beta-unsaturated material and heating the mixture to a temperature of about 350° to 450° F. for a period of time, usually half an hour to 3 hours. After cooling the reaction mixture, the low molecular weight material is added thereto and the reaction is continued until an homogenous reaction mixture is obtained, as evidenced by a withdrawn sample of the reaction mixture, forming a clear solution on cooling to room temperature.

Regardless of which procedure is used, the heating of the adduct or its two precursors with the low molecular weight material in the presence of the sulfonic acid catalyst is carried out under conditions sufficient to obtain a polycarboxylic acid resin product without gelation of the reaction mixture or product. Generally, the heating is carried out in the range of 200° to 500° F., preferably 250° to 450° F., at atmospheric pressure, in a continuous or, preferably, batch-wise reactor until the viscosity of the resulting polycarboxylic acid product is desirably high, for example, in the range of 3 to 50 stokes, as determined on a sample of the product when diluted to 70 weight percent nonvolatile solid with an inert solvent, preferably regular mineral spirits.

Generally, the drying and/or semidrying oils which can be used to prepare the polycarboxylic acid anhydride adduct will be a vegetable oil such as cottonseed oil, corn oil, soybean oil, safflower oil, sunflower oil, oiticica oil, tung oil, rapeseed oil, lineseed oil, perilla oil, poppyseed oil, tall oil, dehydrated castor oil, blown castor oil, etc., and fish oils, such as herring oil, menhaden oil, sardine oil, codfish oil, whale oil, and the like, including mixtures thereof. These oils are unsaturated triglycerides and fatty acids, generally having from 10 to 24 carbon atoms per molecule. Generally, the drying oils and semidrying oils will have iodine values of 80 or more, e.g., the semidrying oils have iodine values of 80 to 150 while the drying oils have iodine values of 150 or more. Some oils, such as the dehydrated and blown oils have residual hydroxyl groups. These oils have hydroxyl values of less than about 50, preferably less than about 40. Further, the drying oil precursor has an acid value of less than 10, preferably less than 5. The drying oil precursor will generally amount to 50 to 95 weight percent, preferably 60 to 95 weight percent, of the polycarboxylic acid anhydride resin. If desired, such drying oils and semidrying oils can be modified by reaction with an alicyclic conjugated diene hydrocarbon, a vinylidene or vinyl substituted monomer, or a conjugated diene, in the same way that the chemically-modified drying oils and semidrying oils described in said copending application are prepared. The drying oils and semidrying oils can also be modified by reaction with carboxylic acids, including saturated, unsaturated or aromatic acids, such as butyric, stearic, linoleic, abietic, phthalic, and benzoic acids, or anhydrides thereof, which modified oils can be made by transesterification. A commercially available modified semidrying oil which can be used to prepare the polycarboxylic acid anhydride component is a cyclopentadiene modified drying oil sold as Admerol–75, which has an iodine value of 120 to 150, an acid value of less than 3 and an hydroxyl value of 2 to 10.

The term "alpha, beta-ethylenically unsaturated dicarboxylic acid," unless indicated otherwise, includes the anhydrides and half-esters of the acids. These unsaturated materials respectively include maleic acid, fumaric acid, itaconic acid, acrylic acid, sorbic acid, mono-butyl maleate, maleic anhydride, itaconic anhydride, and the like, a class of compounds well known in the art. The preferred alpha, beta-unsaturated material is maleic anhydride. Where the alpha, beta-unsaturated material used is an acid or ester, such material is converted during the course of reaction to the anhydride; and where, in this specification and in the claims, the anhydrides are referred to as a class, it should be understood that such reference includes the acid and ester precursors thereof. Generally, the amount of alpha, beta-unsaturated material used in forming the resin of this invention will be from 5 to 45 weight percent, preferably 5 to 20 weight percent of the total weight of resin-forming reactant.

The organic sulfonic acid catalyst used herein can be represented by the formula $$R-SO_3H$$

wherein R is a hydrocarbon radical having from 1 to 12 carbon atoms, preferably from 1 to 10 carbon atoms. R is preferably unsubstituted, but may be substituted with those substituents which do not affect the utility of the compound as a catalyst, e.g., hydroxy and amino compounds. Examples of such organic sulfonic acid catalysts are the alkyl sulfonic acids, such as methane sulfonic acid, ethane sulfonic acid, propane sulfonic acid, butane sulfonic acid, pentane sulfonic acid, hexane sulfonic acid, heptane sulfonic acid and octane sulfonic acid, the cycloaliphatic sulfonic acids such as cyclobutane sulfonic acid, cyclopropane sulfonic acid, cyclopentane sulfonic acid, cyclohexane sulfonic acid, cycloheptane sulfonic acid, cyclooctane sulfonic acid, cyclononane sulfonic acid, etc., the aromatic sulfonic acids, such as para-toluene sulfonic acid, benzene sulfonic acid, xylene sulfonic acid, etc., and the fused aromatic sulfonic acids, such as monosulfonic acids (e.g., naphthol sulfonic acids, naphthylamine sulfonic acids, and aminonaphthol sulfonic acids), the disulfonic sulfonic acids (e.g., naphthalene disulfonic acids, naphthol disulfonic acids, naphthylamine disulfonic acids, dihydroxy naphthalene disulfonic acids, and amino naphthol disulfonic acids) and trisulfonic acids (e.g., 1-naphthylamine-3.6.8-trisulfonic acid). The hydrocarbon radical may be substituted if the substituent does not interfere in the reaction. Further, the preferred sulfonic acid catalysts are the soluble, alkyl sulfonic acids having 1 to 8 carbon atoms in the alkyl groups. The acid catalyst component is a catalytic amount sufficient to increase the reaction return and is generally used in a concentration of 0.05 to 5 weight percent, preferably about 0.1 to 0.5 weight percent, for example, about 0.3 weight percent based on oil.

Where the two-step resin-forming procedure is used, the adduct-forming reaction will generally be carried out at a temperature in the range of 200° to 500° F. for a few minutes to several hours, usually 15 minutes to 6 hours, depending upon the particular reactants used, the amounts thereof, whether the reaction is carried out batch-wise or continuously, and depending upon the viscosity and acid value desired in the resinous polycarboxylic acid adduct. The adduct-forming procedure is usually carried out at atmospheric pressure, although superatmospheric pressure can be used. Generally, the reaction conditions chosen will be such as to produce an adduct product having an acid value in the range of 30 to 250, preferably in the range of 50 to 150, with a viscosity (measured on a sample diluted to 70 weight percent nonvolatile solids with an inert organic solvent, such as mineral spirits) in the range of 3 to 50 stokes.

The adduct-forming reaction and/or resin-forming reaction can be carried out in the presence of an inert solvent in an amount sufficient to enhance the reaction and make it convenient to handle the reaction mixture. The use of the solvent in either reaction is not necessary, but if solvent is used, the solvent can amount to 5 to 200 weight percent of the adduct-forming or resin-forming reactants. Any compatible, inert, aliphatic, cycloaliphatic, and/or aromatic hydrocarbon solvent can be used, such as mineral spirits, xylene, benzene, toluene, petroleum naphtha, cyclohexane, etc., and inert solvents such as diethyl Carbitol.

In order to obtain the polycarboxylic acid resin product of this invention having the desired viscosity, it is essential that the adduct or its precursors be heated with the low molecular weight material, i.e., merely heating the adduct or its precursors or merely mixing such materials with the low molecular weight material without heating, as described, will not produce the desired increase in viscosity and the desired coating properties. In this regard, the mixture is heated at a temperature in the range of 150° to 350° F. until the viscosity of the product is in the range of 10 to 300 stokes when diluted to 80 weight percent nonvolatile solids with an inert solvent, and the product is recovered. Further, to achieve high viscosities for use in electrocoating, for example, the drying oil component must contain residual hydroxyl groups. In this regard, the drying oil component preferably has an hydroxyl value of 5 to 40.

The low molecular weight materials which are used to obtain the polycarboxylic acid resin of this invention preferably are the nonresinous, functional, water-miscible, organic compounds which are normally liquid at room temperature and have molecular weights less than 200. These low molecular weight materials include those having at least one reactive primary or secondary hydroxyl group, such as alkyl, cycloalkyl, and basic mono- or polyhydric alcohols, which can be substituted with ether substituents and/or carboxyl substituents representative hydroxyl-containing compounds which can be used for this purpose include alkanols (preferably monohydric with one to 10 carbon atoms per molecule), such as methanol, ethanol, butanol, isobutanol, amyl alcohol, and octyl alcohol, cycloaliphatic alcohols, such as cyclohexanol, aromatic alcohols such as benzyl alcohol, products such as Cyclol (an adduct of allyl alcohol and cyclopentadiene), polyhydric alcohols, such as ethylene glycol, propylene glycol, glycerol, polyethylene glycol, polypropylene glycol, and methyl, ethyl, propyl and butyl ethers of mono- or diethylene glycol and trimethylolpropane, trimethylolethane, pentaerythritol, dimethylolpropanoic acid, and the like, or mixtures thereof. Water itself is a modifying material which can be used for this purpose. Where the polycarboxylic resin product of this invention is to be used in electrocoating at low voltages, methanol is the preferred low molecular weight material to be used; where the resin product is to be similarly used at high voltages, the low molecular weight material is preferably a mixture of ethylene glycol and ethyl Cellosolve. Where the polycarboxylic resin product is to be used as a conventional, water-thinnable primer, a monofunctional solvent, such as water or ethanol, is the preferred low molecular weight material. The low molecular weight material, in this conventional primer embodiment, acts merely as a coupling agent for rendering the resin product and water miscible. The amount of the low molecular weight material used will be that sufficient to produce a polycarboxylic resin product having a suitable viscosity upon heating the low molecular weight material with said adduct or its precursors. Generally, this amount will be in the range of 50 to 150 weight percent of the stoichiometric amount necessary to react with all of the theoretical acid groups in the alpha, beta-unsaturated reactant used, depending upon the final product viscosity desired.

The reaction can be terminated by cooling the reaction mixture to stop the viscosity increase or, preferably, by quenching the reaction mixture with further solvent and/or with one or more monohydric aliphatic alcohols, such as n-butanol or an ethylene or diethylene glycol, such as one or more of the various Cellosolves and Carbitols (for example, the methyl, ethyl, butyl, N-hexyl and phenyl ethers of ethylene glycol or of diethylene glycol). Similar alkyl ethers of propylene glycol and dipropylene glycol can be used also. Such quenching media act somewhat as stabilizing agents for the resin solution. Usually, the solvent will amount to 15 to 40 percent, preferably 20 to 30 percent by weight of the resin solids in said resin product, the preferred solvent being a mixture of 80 to 98 weight percent of an inert hydrocarbon solvent such as used in the adduct-forming reaction and 2 to 20 weight percent of an aliphatic monohydroxy alcohol such as n-butanol or ethers of ethylene or diethylene alcohol such as diethyl Carbitol.

The solution of the high viscosity resin produced by this invention can be used as a primer vehicle or component in protective coating compositions. In the application of these resins in water-thinned or aqueous systems, the resins are completely or partially neutralized with ammonia, mono- or polyamines, hydroxyl amines, or other inorganic or organic neutralizing agents in an amount sufficient to neutralize from 20 to 150 percent of the ethylenically acid groups in the resin. The solution of dispersed resin would then have a pH of about 7 to 9.5. We prefer to use aliphatic, water-soluble amines (primary, secondary or tertiary) which will volatilize from the uncured film of our resins at temperatures below 375° F.

Representative neutralizing agents which can be used include ammonia, ammonium hydroxide, mono-, di- and trimethyl amine, mono-, di- and triethyl amine, propylethylamine, amylethylamine, methylethylamine and methylbutylamine, allylamine, morpholineamine, mono-, di- and triethanolamine, mono-, di- and triisopropanolamine aniline, hydroxylamine, ethanolamine, butanolamine, ethylene diamine, 1,3-diaminopropane, benzylamine, the reaction product of ethylene diamine with ethylene oxide, polyglycol amines, cyclohexylamine, N-methylethanolamine, n-amino ether ethanolamine, tetraethyl ammonium hydroxide, and the like, including mixtures thereof. This neutralization destroys or splits any acid anhydride groups remaining in the resin and causes the formation of the corresponding salts.

In order to enhance the water dispersible nature of the neutralized resin, the neutralizing agent can be used in conjunction with a cosolvent, i.e., one which is water-miscible and in which the resin is soluble, such as one or more of the hydroxy, low molecular weight liquids mentioned above, and also the Cellosolves, Carbitols, aliphatic alcohols, glycols, glycol amines, glycol ethers, glycol ketones, etc. The amount of the cosolvent should be sufficient to enhance the water dispersibility of the partially neutralized resin. This amount is generally sufficient to provide a dispersion in which said solvent is in the range of 10 to 90 weight percent of the resin. The solvent in which the solvent is dispersed should be one which will volatilize at room temperature in the event that the resins are used in air-drying coating compositions or which will volatilize at elevated baking temperatures, for example, up to about 340° F., in the event the resins are used in coating compositions which are dried by baking.

Both clear and pigmented primer coating compositions based on these resins can be prepared and can be applied by brushing, spraying and dipping. They may also be applied in electrocoating electrically conducted substrates, such as metallic articles. The coatings can be air dried or baked, depending upon use. Driers such as cobalt and manganese naphthanates, for example, 0.05 to 0.20 weight percent, based on the resin, can be incorporated, as well as conventional bleaches, ultraviolet screening agents, fungistats, and the like.

The resins of this invention can be pigmented with conventional paint grinding equipment, e.g., pebble and roller mills. A minor amount of our resin solution can be mixed with the pigment as a grinding aid in the preparation of the pigment dispersion. Pigments and/or fillers which can be used representatively include yellow iron oxide, red iron oxide, white lead, zinc oxide, rutil titanium dioxide, magnesium oxide, chromium oxide, antimony oxide, lead chromate, zinc chromate, lead silicate, chromium, cadmium sulfide yellow, strontium chromate, lithopone, barium sulfate, calcium carbonate, magnesium silicate, aluminum silicate, magnesium carbonate, mica, pumice, bentonite, China Clay, talc, carbon black, toluidine, phthaloazamine blue and the like, including mixtures thereof. Dyes or tints can also be used.

In using the resins of this invention in electrocoating, the paints prepared by admixing the resin and pigment can be diluted with water to yield baths having 2 to 35, preferably 5 to 15, weight percent nonvolatile solids. Electrocoating of metal surfaces or other electrically conductive objects can be carried out by conventional techniques with such baths, for example, by making the object to be coated the anode of a D.C. electrical circuit and using a metal tank to hold the bath and serve as the cathode. The voltage of the system can be 50 to 1,000 volts, using amperages of 0.1 to 10 amps per square foot of immersed electrode surface and conductivities of 100 to 3,000 ohm$^{-1}$/cm. The surfaces or articles which can be electrocoated with the resins of this invention include any of those which are sufficiently electrically conductive, such as steel, aluminum, tin, copper, iron, zinc, etc., the nature of the surface or article determining what voltage and other electrocoating conditions should be used to obtain optimum results, these conditions being determined by simple routine tests known in the art. After electrocoating the article, the coated article can be rinsed with water and passed to a stoving area where the coating is cured, for example, 20 minutes at a temperature of 350° F.

The objects and advantages of this invention are further illustrated by the following examples, but it should be understood that various materials and amounts thereof used in these examples, conditions of reaction, and other details should not be construed to unduly limit this invention. In these examples, "parts" means parts by weight, and some of the recited amounts of the materials do not take into account the removal of small samples of reaction mixture for solids and viscosity monitoring purposes, these small amounts being insignificant in the overall reactions.

EXAMPLE I

A reactor was charged with 1,200 parts of a modified drying oil comprising a copolymer (Admerol–75) of 80 weight percent linseed oil and 20 weight percent cyclopentadiene and 3.6 parts (0.3% by weight of oil) of methane sulfonic acid. The charged oil and acid were heated to 200° F. in the presence of a blanket of nitrogen, after which 148 parts of maleic anhydride were added. The contents of the reactor were then heated to 400° F. and held at that temperature for 50 minutes to form the adduct. Heating was discontinued and water was added slowly and continuously, such that 27.2 parts of water were added over a 56-minute period. The heating was then discontinued and 169 parts of butyl Carbitol (monobutyl ether of diethylene glycol) and 396 parts of Cellosolve (monoethyl ether of ethylene glycol) were added. The resulting polycarboxylic acid resin solution had a nonvolatile solids content of 73.5 percent, a viscosity of 26.0 stokes, a Gardner color of 12 and a nonvolatile acid value of 78.0.

953 parts of said resin solution were mixed with 56.8 parts of diethyl amine, after which 571.2 parts of water, 14.1 parts of butyl Carbitol and 32.9 parts of Cellosolve were added to make 1,628 parts. A drier comprising manganese naphthenate was added in an amount of 0.075 percent by weight of resin. The primer vehicle thus obtained was applied in a film to a test panel and baked at about 350° F. for 20 minutes. A film, 1.5 mils thick (when applied), having a hardness of 50 Sward, was obtained.

EXAMPLE II

A polycarboxylic acid resin was prepared by the procedure described in Example I, except that the adduct-forming reaction was not conducted in the presence of methane sulfonic acid. Further, a reaction time of 75 minutes was required for the adduct reaction. The resulting polycarboxylic acid resin solution before neutralization had a nonvolatile solids content of 70 weight percent, a viscosity of 20.5 stokes, a Gardner color of 6 and a nonvolatile acid value of 105.5.

One thousand parts of the resin solution were mixed with 76.4 parts of diethyl amine, after which sufficient water was added to make 1,628 parts. The resulting vehicle had a nonvolatile solids content of 44.0 percent, a viscosity of 143.5 stokes and a Gardner color of 8–9. A drier comprising manganese naphthenate was added as in Example I and the primer vehicle, thus obtained, was applied as above to a test panel and baked at 350° F. for 20 minutes. The baked film had a thickness of 1.5 mils (when applied) and a hardness of 34 Sward.

Thus, when the catalyst was used, the reaction time required for adduct formation was lowered by 25 minutes from that required by the uncatalyzed reaction. Further, the film hardness obtained using the resin produced in the catalyzed reaction was 16 Sward greater than that obtained from the resin produced in the uncatalyzed reaction.

EXAMPLE III

The vehicle produced according to Example I is diluted with sufficient water to provide a vehicle dispersion having a nonvolatile solids content of 6 weight percent.

A pigment dispersion is prepared by mixing 500 parts of water, 310 parts of the neutralized resin solution produced in Example II and about 30 parts of diethylamine; then 800 parts of pigment grade ferric oxide, 78 parts of diatomaceous earth (Cabosil), about 10 parts of a 25% solution of a silicone wetting agent (Silicone DL 5310) and 100 parts of deionized water are mixed and ground in a pebble mill to provide a pigment dispersion having about 10 weight percent nonvolatile resin solids and about 35 weight percent nonvolatile pigment solids.

The vehicle dispersion and the pigment dispersion in a ratio of about 2 to 1 are slowly and concurrently added with agitation to a mixture of about 2,500 parts of water and about 1.5 parts diethylamine. The so-prepared electrocoating bath has a pH of about 8.00, a pigment volume concentration (PVC) of about 5.5 percent, and contains about 7.0 weight percent nonvolatile solids.

A plurality of Bonderite 37 test panels (4" x 12" of 20-gauge steel precoated with zinc phosphate) are electrocoated in turn in said bath at preset EMF's of 50, 100 and 200 volts of D.C. current. The electrocoated panels are then withdrawn from the bath, rinsed with tap water and baked at 340° F. for 20 minutes. In all cases, the coatings are uniform in thickness, have a desirable semigloss and good surface integrity.

The apparatus which is used in carrying out the above electrocoating operation comprises a 1-gallon, tin-plated steel can into which each test panel is lowered automatically at a rate of 1 ft./min., using a motor-driven, geared arm to which the panel is affixed. The can is grounded and serves as a cathode while the hanger from which the panel depends is connected to the positive pole of a power source so that the panel serves as the anode of an electrical circuit. The bath (about 300 g.) is prepared in the can and the panel is lowered uniformly until about ⅞ of the panel is immersed in the bath; after one minute, the panel is uniformly withdrawn from the bath at the rate of 1 ft. per minute.

As used in this application, the term "acid value" (or "acid number") means the analytical value indicative of the free acid and/or acid anhydride in a system as determined according to Gardner & Sward's Paint Testing Manual, 12th ed., 1962, p. 425, which procedure follows essentially that of ASTM D 555; the term represents the number of milligrams of KOH required to neutralize the acidity of a 1-gram sample of nonvolatile solids. Where the weight percent of nonvolatile solids of a system is recited, this value is determined according to Method B on p. 505 of said manual by placing 0.5 gram of a sample in a 100 mm. diameter aluminum dish, diluting the sample with 1 to 2 ml. of a solvent such as benzene, heating the sample on a hot plate (150° C.) for 30 minutes, cooling, weighing the nonvolatile residue, subtracting this weight from that of the sample, and multiplying the remainder by 100. The term "iodine value" (or "iodine number") means the analytical value indicative of the unsaturation of a system as determined according to p. 428–429 of said manual, and represents the percent of iodine which will react with an unsaturated material. Where the viscosity of a system is recited, in terms of stokes, the viscosity measurement is determined according to the Gardner-Holdt bubble viscometer procedure described on p. 171 of said manual. The term "hydroxyl value" (or "hydroxyl number") means the analytical value determined according to p. 433 of said manual, and represents the amount of hydroxyl groups in a system. Where reference is made to the use of mineral spirits to adjust the nonvolatile solids content of a polycarboxylic acid resin product for purposes of determining or specifying the viscosity of such product, regular mineral spirits are used having an aniline point of 53–59° C., a flash point (TCC) minimum of 100° F., and the following distillation: initial boiling point, 310° F. min.; 50 percent, 331° F. min.; 90 percent, 380° F. max.; and end point, 375–395° F.

Various modifications and alterations of this invention will become apparent to those skilled in the art without departing from the scope and spirit of this invention, and it should be understood that this invention should not be limited unduly to that set forth herein for illustrative purposes.

We claim:
1. A water-dilutable thermosetting resinous composition prepared by reacting at a temperature between about 200 and 500° F. in the presence of a catalytic amount of a lower alkyl sulfonic acid from about 5 to 45 parts of an alpha, beta-ethylenically unsaturated dicarboxylic acid or anhydride and correspondingly from about 95 to 55 parts of a drying oil to provide an adduct thereof having a viscosity of from 3 to 50 stokes as determined for a 70 percent nonvolatile solution of the adduct in mineral spirits, and thereupon reacting said adduct at a temperature between about 150° and 350° F. with from about 50 to 150 percent of the equivalent amount of a lower alkanol or a diol having a molecular weight not in excess of 200 including the lower alkyl monoethers thereof to provide a final product having a viscosity between about 10 and 30 stokes as determined for an 80 percent nonvolatile solution of the product in mineral spirits.

2. A water-dilutable thermosetting resinous composition in accordance with claim 1 wherein said dicarboxylic acid anhydride is maleic anhydride.

3. A water-dilutable thermosetting resinous composition in accordance with claim 2 wherein said drying oil is a copolymer of about 80 parts by weight linseed oil and 20 parts by weight cyclopentadiene.

4. A water-dilutable thermosetting resinous composition in accordance with claim 3 wherein said lower alkyl sulfonic acid is methane sulfonic acid.

References Cited

UNITED STATES PATENTS

| | | |
|---|---|---|
| 2,306,281 | 12/1942 | Rust. |
| 2,495,458 | 1/1950 | Kanning et al. _____ 260—23 |
| 3,098,834 | 7/1963 | Jerabek _____ 260—23.7 |
| 3,228,900 | 1/1966 | Spellberg et al. _____ 260—23 |
| 3,230,162 | 1/1966 | Gilchrist _____ 204—181 |
| 3,251,790 | 5/1966 | Christenson et al. |
| 3,293,201 | 12/1966 | Shahade et al. _____ 260—23 |
| 3,297,557 | 1/1967 | Huggard _____ 204—181 |

JOHN H. MACK, Primary Examiner.

E. ZAGARELLA, Assistant Examiner.

U.S. Cl. X.R.

204—181